(12) United States Patent
Virtuoso et al.

(10) Patent No.: US 10,909,114 B1
(45) Date of Patent: Feb. 2, 2021

(54) PREDICTING PARTITIONS OF A DATABASE TABLE FOR PROCESSING A DATABASE QUERY

(71) Applicant: Amazon Technologies, Inc., Seattle, WA (US)

(72) Inventors: Anthony A. Virtuoso, Hawthorne, NJ (US); Turkay Mert Hocanin, New York, NY (US)

(73) Assignee: Amazon Technologies, Inc., Seattle, WA (US)

( * ) Notice: Subject to any disclaimer, the term of this patent is extended or adjusted under 35 U.S.C. 154(b) by 199 days.

(21) Appl. No.: 16/012,688

(22) Filed: Jun. 19, 2018

(51) Int. Cl.
*G06F 16/24* (2019.01)
*G06F 16/2453* (2019.01)
*G06F 16/22* (2019.01)
*G06F 16/2455* (2019.01)

(52) U.S. Cl.
CPC .... *G06F 16/24542* (2019.01); *G06F 16/2282* (2019.01); *G06F 16/24554* (2019.01)

(58) Field of Classification Search
CPC .......... G06F 16/24557; G06F 16/2282; G06F 16/24554
See application file for complete search history.

(56) References Cited

U.S. PATENT DOCUMENTS

| | | | |
|---|---|---|---|
| 6,931,390 B1 | 8/2005 | Zait et al. | |
| 7,043,491 B1 | 5/2006 | Gong | |
| 9,317,577 B2 | 4/2016 | Duan et al. | |
| 9,779,117 B1* | 10/2017 | Guo | H04L 67/10 |
| 2004/0098390 A1* | 5/2004 | Bayliss | G06F 16/27 |
| 2008/0114746 A1* | 5/2008 | Day | G06F 16/2453 |
| 2014/0075031 A1* | 3/2014 | Doering | H04L 47/70 709/226 |
| 2015/0169252 A1* | 6/2015 | Krishnamurthi | G06F 3/0644 711/114 |
| 2016/0371329 A1* | 12/2016 | Bensberg | G06F 16/24542 |
| 2017/0039232 A1* | 2/2017 | Jayanth | G06F 16/278 |

OTHER PUBLICATIONS

Actian Ingress 2006 SQL Reference Guide, p. 387 (Year: 2006).*

* cited by examiner

*Primary Examiner* — Apu M Mofiz
*Assistant Examiner* — Farhad Agharahimi
(74) *Attorney, Agent, or Firm* — Robert C. Kowert; Kowert, Hood, Munyon, Rankin & Goetzel, P.C.

(57) ABSTRACT

Partitions of a database table may be predicted for processing database queries. When a database query to a database is received, partitions of the database table that may exist may be predicted according to a partitioning scheme. The predicted partitions may be accessed in order to perform the query. In some embodiments, the partitioning scheme may be received from a user of the database. In some embodiments, the partitioning scheme may be obtained by analyzing the database table.

20 Claims, 11 Drawing Sheets

PREDICTING PARTITIONS OF A DATABASE TABLE FOR PROCESSING A DATABASE QUERY

BACKGROUND

As the technological capacity for organizations to create, track, and retain information continues to grow, a variety of different technologies for managing and storing the rising tide of information have been developed. Database systems, for example, provide clients with many different specialized or customized configurations of hardware and software to manage stored information. However, the increasing amounts of data that organizations must store and manage often correspondingly increases both the size and complexity of data storage and management technologies, like database systems, which in turn escalate the cost of maintaining the information. New technologies more and more seek to reduce both the complexity and storage requirements of maintaining data while simultaneously improving the efficiency of data processing.

For example, data may be divided into partitions in order to allow for opportunities to distribute the storage and processing of the data according to partitions. Query processing to data, for instance, can be divided up amongst multiple different resources which may perform the query with respect to a partition of the data in parallel with other resources, saving time when performing the query. Because data continues to grow, as noted above, the costs of maintaining information that indicates where and how data is partitioned may impact the performance of queries. Thus, techniques that can improve the performance of storing and providing access to data in the face of growing distribution of the data in partitions are highly desirable.

Figure 1:
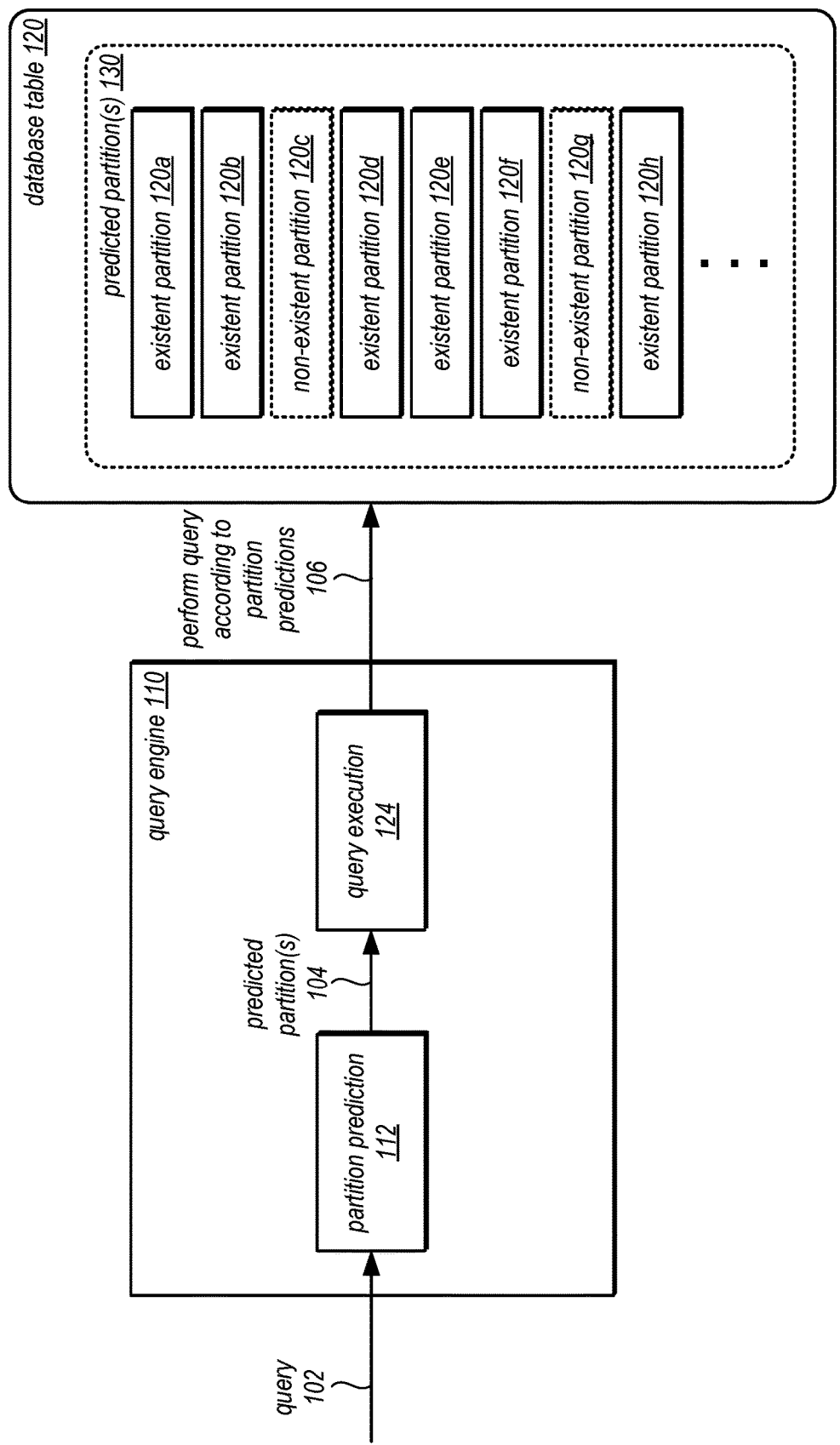
FIG. 1 illustrates a logical block diagram of predicting partitions of a database table for processing database queries, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

Various embodiments of predicting partitions of a database table for processing database queries are described herein. In some embodiments, a database table may be partitioned into separate physical or logical partitions. For example, a database table may be stored as separate files, each of which may be a partition of the database table that together makeup the database table. In some scenarios, database tables can have large numbers of partitions (e.g., thousands or millions of partitions) which may need to be considered when providing access to the database table for performing queries or adding new data (which may be an additional partition to the data). In various embodiments, a partitioning scheme for a database table may be used to predict the partitions of database table without accessing static metadata that describes the partitions (e.g., what range of values in one or more columns is within a partition). In this way, predicted partitions may be dynamically identified according to the partitioning scheme, increasing the performance of a query engine or other system that performs queries to a database table so that the appropriate partitions for the database query can be identified without scanning and/or evaluating metadata describing table partitions, in some embodiments. Additionally, the partitioning scheme may automatically account for additional partitions of data as they are added to the database table without requiring an explicit request (e.g., from a user to update metadata) and saving storage space that would otherwise be used to maintain the partition metadata, in some embodiments.

FIG. 1 illustrates a logical block diagram of predicting partitions of a database table for processing database queries, according to some embodiments. Database table 120 may be a collection of data items, objects, records, entries, rows, or other information which may be partitioned, in some embodiments. For example, database table 120 may be a relational database table which may be partitioned according to one or more column values in the table, in some embodiments. In some embodiments, database table 120 may be a non-relational, or other type of database table which can be partitioned according to a partition scheme (e.g., according to one or more attributes shared in common amongst different objects in the table).

Query engine 110 may be implemented as part of a standalone database management system to provide access to database table 120, as part of providing access to a larger database, in some embodiments. In some embodiments, query engine 110 may be implemented as part of a service, such as managed query service 270, database service, or data processing service 220, discussed below. In some embodiments, database table 120 may be stored separate from query engine 110 and may have to be transferred (e.g., over a network) to a system implementing query engine 110 or may be stored in a locally attached storage device (e.g., on a disk-based storage device) implemented as part of a same host system as query engine 110.

Query engine 110 may implement partition prediction 112 as part of performing a query 102 to database table 120, in some embodiments. For example, when query 102 is received, partition predication 112 may evaluate a partitioning scheme for database table 120 to identify predicted partitions 130 (e.g., partitions of database table 120 that are expected to exist but may not exist). For example, as discussed in more detail below with regard to FIGS. 7-9, a partitioning scheme may map ranges of values (e.g., standard values, such as integers, strings, dates, or other database supported values, o custom values, such as user types, etc.) stored in database table 120 (e.g., one or more columns) to different respective partitions so that a partition of partitions (and corresponding range values) can be determined (e.g., month and year value partitions, such as January 2018 partition, February 2018 partition, and so on), in some embodiments. Partition prediction 112 may provide the predicted partition(s) 104 to query execution 124 which may perform query planning or other features in order to perform the query with respect to the predicted partitions, as indicated at 106. For example, partition pruning, as discussed below with regard to FIG. 9, may be implemented, in some embodiments, in order to remove predicted partitions that may not satisfy the query.

Figure 10:
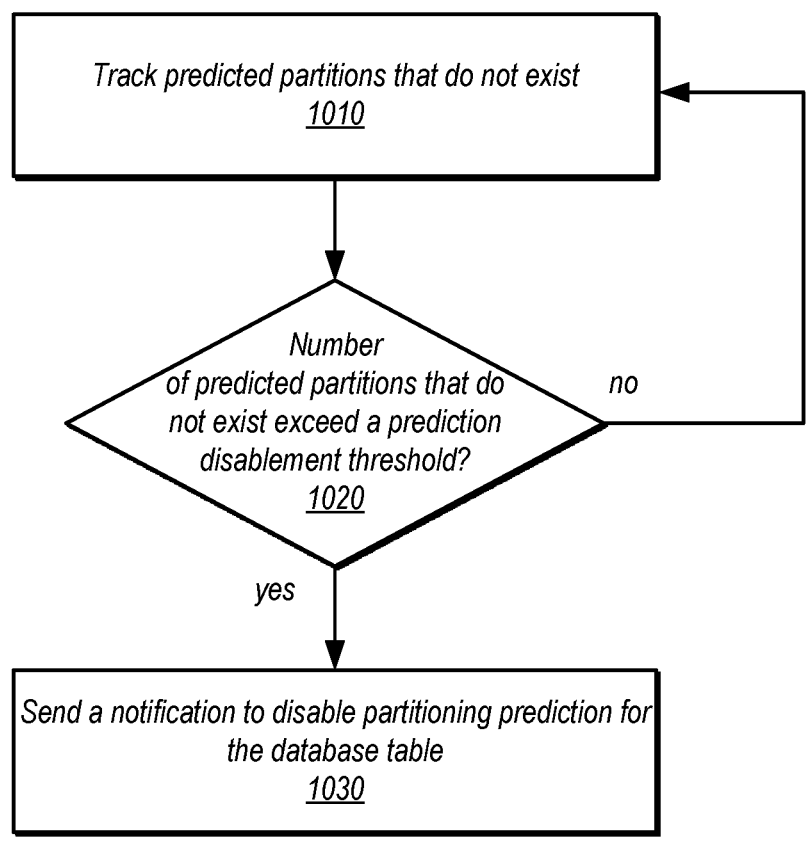
FIG. 10 is a high-level flowchart illustrating various methods and techniques to tracking predicted partitions that do not exist, according to some embodiments.

Evaluation of a partitioning scheme for a database table such as database table 120 may identify database table partitions that may exist, without guaranteeing existence of the partitions, in some embodiments. For example partitions 120a, 120b, 120d, 120e, 120f and 120h are existent partitions that are predicted 130, whereas partitions 120c and 120g are non-existent partitions that are predicted. Non-existent partitions can be handled in various ways when performing a query. For example, in some embodiments, an error may be triggered that aborts performance of the query. In some embodiments, non-existent partitions may be detected when attempting to access the non-existent partition and then skipped or ignored for query processing. FIG. 10 provides further discussion of various ways in which tracking of non-existent predicted partitions can be used.

Please note that the previous description of predicting partitions of a database table for processing database queries is a logical illustration and thus is not to be construed as limiting as to the implementation of a query engine, database table, or database table partition.

This specification begins with a general description of a provider network that that includes different services which can implement predicting partitions of a database table for performing database queries, such as data processing services, database services, and/or a managed query service. Then various examples of the managed query service including different components/modules, or arrangements of components/module that may be employed as part of implementing predicting partitions of a database table for performing database queries are discussed as one example of a system that performs database queries that may implement the below techniques. Other systems or services that provide access to a database table that is partitioned can also implement such techniques. A number of different methods and techniques to implement predicting partitions of a database table for performing database queries are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
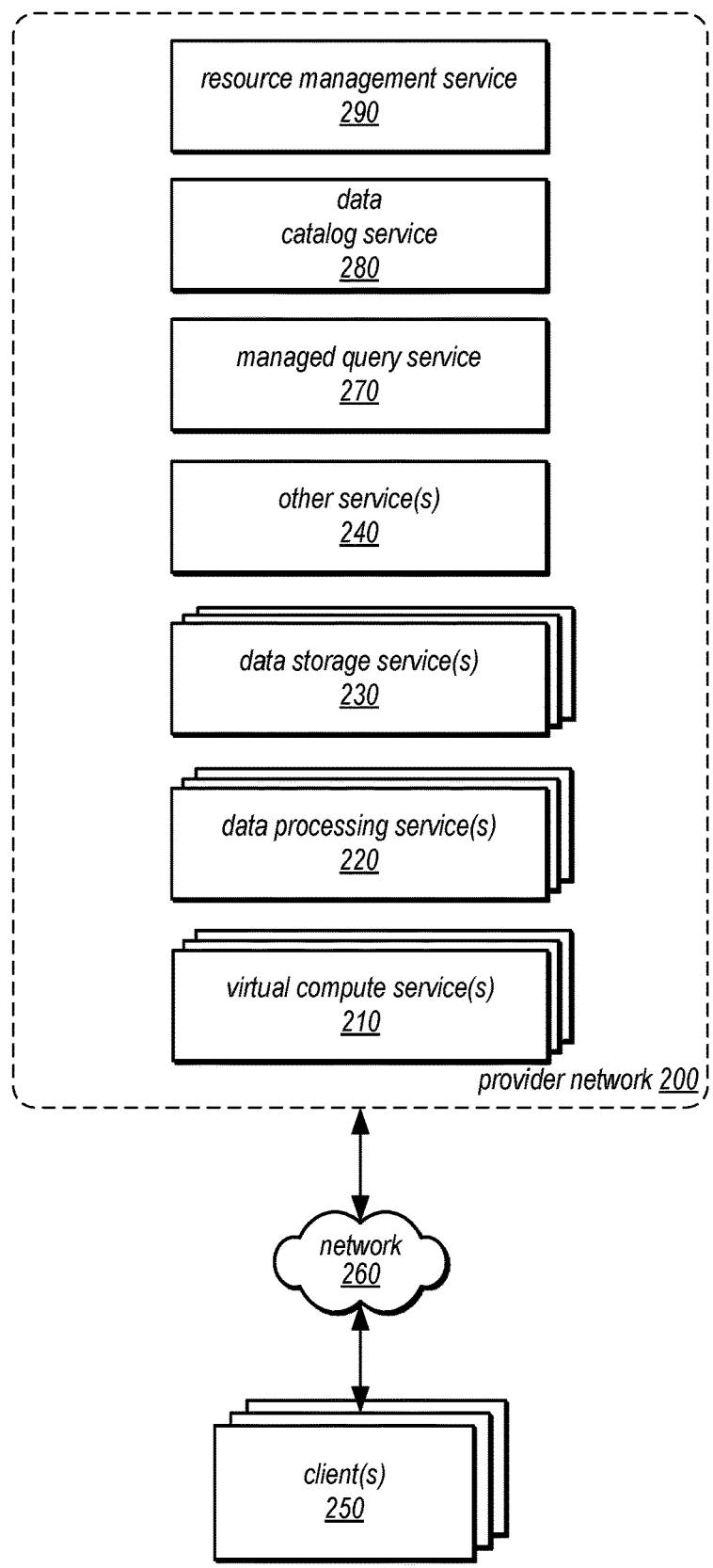
FIG. 2 is a logical block diagram illustrating a provider network offering different services, including a managed query service that can predict partitions of a database table for processing database queries, according to some embodiments.

FIG. 2 is a logical block diagram illustrating a provider network offering different services, including a managed query service that can predict partitions of a database table for processing database queries, according to some embodiments. A provider network 200 may be a private or closed system or may be set up by an entity such as a company or a public sector organization to provide one or more services (such as various types of cloud-based storage) accessible via the Internet and/or other networks to clients 250, in some embodiments. The provider network may be implemented in a single location or may include numerous provider network regions that may include one or more data centers hosting various resource pools, such as collections of physical and/or virtualized computer servers, storage devices, networking equipment and the like (e.g., computing system 2000 described below with regard to FIG. 11), needed to implement and distribute the infrastructure and storage services offered by the provider network 200.

In some embodiments, provider network 200 may implement various computing resources or services, such as a virtual compute services 210, data processing service(s) 220, (e.g., relational or non-relational (NoSQL) database query engines, map reduce processing, data flow processing, map-reduce or other distributed data processing systems that may perform queries and/or other large scale data processing techniques), data storage service(s) 230, (e.g., an object storage service, block-based storage service, or data storage service that may store different types of data for centralized access) other services 240 (any other type of network based services (which may include various other types of storage, processing, analysis, communication, event handling, visualization, and security services not illustrated), managed query service 270, data catalog service 280, and resource management service 290.

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 11 and described below. In various embodiments, the functionality of a given system or service component (e.g., a component of data storage service 230) may be implemented by a particular node or may be distributed across several nodes. In some embodiments, a given node may implement the functionality of more than one service system component (e.g., more than one data store component).

Virtual compute service 210 may be implemented by provider network 200, in some embodiments. Virtual computing service 210 may offer instances and according to various configurations for client(s) 250 operation. A virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). A number of different types of computing devices may be used singly or in combination to implement the compute instances and of provider network 200 in different embodiments, including general purpose or special purpose computer servers, storage devices, network devices and the like. In some embodiments instance client(s) 250 or other any other user may be configured (and/or authorized) to direct network traffic to a compute instance.

Compute instances may operate or implement a variety of different platforms, such as application server instances, Java™ virtual machines (JVMs), general purpose or special-purpose operating systems, platforms that support various interpreted or compiled programming languages such as Ruby, Perl, Python, C, C++ and the like, or high-performance computing platforms) suitable for performing client(s) 250 applications, without for example requiring the client(s) 250 to access an instance. Applications (or other software operated/implemented by a compute instance and may be specified by client(s), such as custom and/or off-the-shelf software.

In some embodiments, compute instances have different types or configurations based on expected uptime ratios. The uptime ratio of a particular compute instance may be defined as the ratio of the amount of time the instance is activated, to the total amount of time for which the instance is reserved. Uptime ratios may also be referred to as utilizations in some implementations. If a client expects to use a compute instance for a relatively small fraction of the time for which the instance is reserved (e.g., 30%-35% of a year-long reservation), the client may decide to reserve the instance as a Low Uptime Ratio instance, and pay a discounted hourly usage fee in accordance with the associated pricing policy. If the client expects to have a steady-state workload that requires an instance to be up most of the time, the client may reserve a High Uptime Ratio instance and potentially pay an even lower hourly usage fee, although in some embodiments the hourly fee may be charged for the entire duration of the reservation, regardless of the actual number of hours of use, in accordance with pricing policy. An option for Medium Uptime Ratio instances, with a corresponding pricing policy, may be supported in some embodiments as well, where the upfront costs and the per-hour costs fall between the corresponding High Uptime Ratio and Low Uptime Ratio costs.

Compute instance configurations may also include compute instances with a general or specific purpose, such as computational workloads for compute intensive applications (e.g., high-traffic web applications, ad serving, batch processing, video encoding, distributed analytics, high-energy physics, genome analysis, and computational fluid dynamics), graphics intensive workloads (e.g., game streaming, 3D application streaming, server-side graphics workloads, rendering, financial modeling, and engineering design), memory intensive workloads (e.g., high performance databases, distributed memory caches, in-memory analytics, genome assembly and analysis), and storage optimized workloads (e.g., data warehousing and cluster file systems). Size of compute instances, such as a particular number of virtual CPU cores, memory, cache, storage, as well as any other performance characteristic. Configurations of compute instances may also include their location, in a particular data center, availability zone, geographic, location, etc . . . and (in the case of reserved compute instances) reservation term length. Different configurations of compute instances, as discussed below with regard to FIG. 3, may be implemented as computing resources associated in different pools of resources managed by resource management service 290 for executing jobs routed to the resources, such as queries routed to select resources by managed query service 270.

Data processing services 220 may be various types of data processing services to perform different functions (e.g., query or other processing engines to perform functions such as anomaly detection, machine learning, data lookup, or any other type of data processing operation). For example, in at least some embodiments, data processing services 230 may include a map reduce service that creates clusters of processing nodes that implement map reduce functionality over data stored in one of data storage services 240. Various other distributed processing architectures and techniques may be implemented by data processing services 230 (e.g., grid computing, sharding, distributed hashing, etc.). Note that in some embodiments, data processing operations may be implemented as part of data storage service(s) 230 (e.g., query engines processing requests for specified data). Data processing service(s) 230 may be clients of data catalog service 220 in order to obtain structural information for performing various processing operations with respect to data sets stored in data storage service(s) 230, as provisioned resources in a pool for managed query service 270.

Data catalog service 280 may provide a catalog service that ingests, locates, and identifies data and the schema of data stored on behalf of clients in provider network 200 in data storage services 230. For example, a data set stored in a non-relational format may be identified along with a container or group in an object-based data store that stores the data set along with other data objects on behalf of a same customer or client of provider network 200. In at least some embodiments, data catalog service 280 may direct the transformation of data ingested in one data format into another data format. For example, data may be ingested into data storage service 230 as single file or semi-structured set of data (e.g., JavaScript Object Notation (JSON)). Data catalog service 280 may identify the data format, structure, or any other schema information of the single file or semi-structured set of data. In at least some embodiments, the data stored in another data format may be converted to a different data format as part of a background operation (e.g., to discover the data type, column types, names, delimiters of fields, and/or any other information to construct the table of semi-structured data in order to create a structured version of the data set). Data catalog service 280 may then make the schema information for data available to other services, computing devices, or resources, such as computing resources or clusters configured to process queries with respect to the data, as discussed below with regard to FIGS. 3-7. Data catalog service 280 may, in various embodiments collect, determine, maintain, obtain or otherwise store statistics on data sets, such as number of rows in a data object (e.g., table), number of storage units (e.g., blocks) for a data object, average size of data within the data object (e.g., row length), data distribution (e.g., histograms), data selectivity or density, and so on.

Data storage service(s) 230 may implement different types of data stores for storing, accessing, and managing data on behalf of clients 250 as a network-based service that enables clients 250 to operate a data storage system in a cloud or network computing environment. For example, data storage service(s) 230 may include various types of database storage services (both relational and non-relational) for storing, querying, and updating data. Such services may be enterprise-class database systems that are highly scalable and extensible. Queries may be directed to a database in data storage service(s) 230 that is distributed across multiple physical resources, and the database system may be scaled up or down on an as needed basis. The database system may work effectively with database schemas of various types and/or organizations, in different embodiments. In some embodiments, clients/subscribers may submit queries in a number of ways, e.g., interactively via an SQL interface to the database system. In other embodiments, external applications and programs may submit queries using Open Database Connectivity (ODBC) and/or Java Database Connectivity (JDBC) driver interfaces to the database system.

One data storage service 230 may be implemented as a centralized data store so that other data storage services may access data stored in the centralized data store for processing and or storing within the other data storage services, in some embodiments. A may provide storage and access to various kinds of object or file data stores for putting, updating, and getting various types, sizes, or collections of data objects or files. Such data storage service(s) 230 may be accessed via programmatic interfaces (e.g., APIs) or graphical user interfaces. A centralized data store may provide virtual block-based storage for maintaining data as part of data volumes that can be mounted or accessed similar to local block-based storage devices (e.g., hard disk drives, solid state drives, etc.) and may be accessed utilizing block-based data storage protocols or interfaces, such as internet small computer interface (iSCSI).

In at least some embodiments, one of data storage service(s) 230 may be a data warehouse service that utilizes a centralized data store implemented as part of another data storage service 230. A data warehouse service as may offer clients a variety of different data management services, according to their various needs. In some cases, clients may wish to store and maintain large of amounts data, such as sales records marketing, management reporting, business process management, budget forecasting, financial reporting, website analytics, or many other types or kinds of data. A client's use for the data may also affect the configuration of the data management system used to store the data. For instance, for certain types of data analysis and other operations, such as those that aggregate large sets of data from small numbers of columns within each row, a columnar database table may provide more efficient performance. In other words, column information from database tables may be stored into data blocks on disk, rather than storing entire rows of columns in each data block (as in traditional database schemes).

Managed query service 270, as discussed below in more detail with regard to FIGS. 3-6, may manage the execution of queries on behalf of clients so that clients may perform queries over data stored in one or multiple locations (e.g., in different data storage services, such as an object store and a database service) without configuring the resources to execute the queries, in various embodiments. Resource management service 290, as discussed in more detail below, may manage and provide pools of computing resources for different services like managed query service 270 in order to execute jobs on behalf the different services, as discussed above with regard to FIG. 1. Queries may be received that are directed to one service (e.g., managed query service 270) or to data stored or accessed by multiple services (e.g., processing services 220 and/or data storage service(s) 230), in some embodiments.

Generally speaking, clients 250 may encompass any type of client configurable to submit network-based requests to provider network regions 200 via network 260, including requests for storage services (e.g., a request to create, read, write, obtain, or modify data in data storage service(s) 240, etc.) or managed query service 270 (e.g., a request to query data in a data set stored in one or more of data storage service(s) 230). For example, a given client 250 may include a suitable version of a web browser, or may include a plug-in module or other type of code module that may execute as an extension to or within an execution environment provided by a web browser. Alternatively, a client 250 may encompass an application such as a database application (or user interface thereof), a media application, an office application or any other application that may make use of storage resources in data storage service(s) 240 to store and/or access the data to implement various applications. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 250 may be an application may interact directly with provider network 200. In some embodiments, client 250 may generate network-based services requests according to a Representational State Transfer (REST)-style network-based services architecture, a document- or message-based network-based services architecture, or another suitable network-based services architecture.

In some embodiments, a client 250 may provide access to provider network regions 200 to other applications in a manner that is transparent to those applications. For example, client 250 may integrate with an operating system or file system to provide storage on one of data storage service(s) 230 (e.g., a block-based storage service). However, the operating system or file system may present a different storage interface to applications, such as a conventional file system hierarchy of files, directories and/or folders. In such an embodiment, applications may not need to be modified to make use of the storage system service model. Instead, the details of interfacing to the data storage service(s) 230 may be coordinated by client 250 and the operating system or file system on behalf of applications executing within the operating system environment.

Clients 250 may convey network-based services requests (e.g., queries or other access requests directed to data in data storage service(s) 230, operations, tasks, or jobs, being performed as part of data processing service(s) 230, or to interact with data catalog service 220) to and receive responses from provider network regions 200 via network 260. In various embodiments, network 260 may encompass any suitable combination of networking hardware and protocols necessary to establish network-based-based communications between clients 250 and provider network 200. For example, network 260 may generally encompass the various telecommunications networks and service providers that collectively implement the Internet. Network 260 may also include private networks such as local area networks (LANs) or wide area networks (WANs) as well as public or private wireless networks. For example, both a given client 250 and provider network regions 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and provider network regions 200. It is noted that in some embodiments, clients 250 may communicate with provider network regions 200 using a private network rather than the public Internet.

Figure 3:
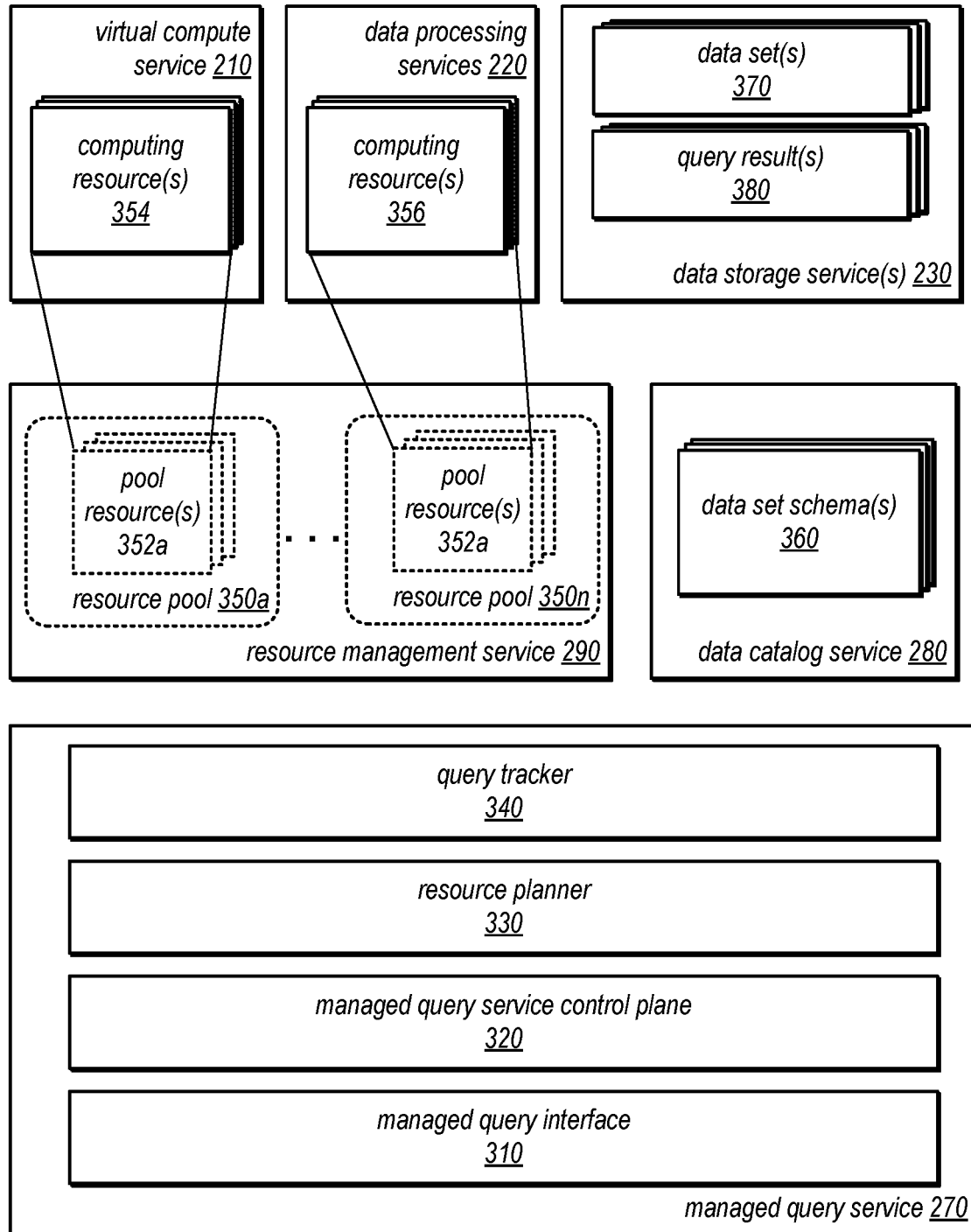
FIG. 3 is a logical block diagram illustrating a managed query service, according to some embodiments.

FIG. 3 is a logical block diagram illustrating a managed query service, according to some embodiments. As discussed below with regard to FIGS. 4-6, managed query service 270 may leverage the capabilities of various other services in a provider network region 200. For example, managed query service 270 may utilize resource management service 290 to provision and manage pools of preconfigured resources to execute queries, provide resources of preconfigured queries, and return utilized resources to availability. For example, resource management service 290 may instantiate, configure, and provide resource pool(s) 350*a* and 350*n* that include pool resource(s) 352*a* and 352*n* from one or more different resource services, such as computing resource(s) 354 in virtual compute service 210 and computing resource(s) 356 in data processing service(s) 220. Resource management service 290 may send requests to create, configure, tag (or otherwise associate) resources 352 for a particular resource pool, terminate, reboot, otherwise operate resources 352 in order to execute jobs on behalf of other network-based services. Resource management service 290 may evaluate and determine when available capacity of resources in pools of other regions 200 as may be obtained by cross-region resource sharing service should be selected to perform queries, in some embodiments.

Once a resource from a pool is provided (e.g., by receiving an identifier or other indicator of the resource to utilize), managed query service 270 may interact directly with the resource 354 in virtual compute service 210 or the resource 356 in data processing services 220 to execute queries, in various embodiments. Managed query service 270 may utilize data catalog service 280, in some embodiments to store data set schemas 352, as discussed below with regard to FIG. 4, for subsequent use when processing queries, in some embodiments. For example, a data set schema may identify the field or column data types of a table as part of a table definition so that a query engine (executing on a computing resource), may be able to understand the data being queried, in some embodiments. Managed query service 270 may also interact with data storage service(s) 230 to directly source data sets 370 or retrieve query results 380, in some embodiments. Schema information may, in some embodiments, include a partitioning scheme, as discussed below with regard to FIG. 4.

Managed query service 270 may implement a managed query interface 310 to handle requests from different client interfaces, as discussed below with regard to FIG. 4. For example, different types of requests, such as requests formatted according to an Application Programmer Interface (API), standard query protocol or connection, or requests received via a hosted graphical user interface implemented as part of managed query service may be handled by managed query interface 310.

Managed query service 270 may implement managed query service control plane 320 to manage the operation of service resources (e.g., request dispatchers for managed query interface 310, resource planner workers for resource planner 330, or query tracker monitors for query tracker 340). Managed query service control plane 320 may direct requests to appropriate components as discussed below with regard to FIG. 5. Managed query service 270 may implement authentication and authorization controls for handling requests received via managed query interface 310. For example, managed query service control plane 320 may validate the identity or authority of a client to access the data set identified in a query received from a client (e.g., by validating an access credential). In at least some embodiments, managed query service control plane 320 may maintain (in an internal data store or as part of a data set in an external data store, such as in one of data storage service(s) 230), query history, favorite queries, or query execution logs, and other managed query service historical data. Query execution costs may be billed, calculated or reported by managed query service control plane 320 to a billing service (not illustrated) or other system for reporting usage to users of managed query service, in some embodiments.

Managed query service 270 may implement resource planner 330 to intelligently select available computing resources from pools for execution of queries, in some embodiments. For example, resource planner 330 may evaluated collected data statistics associated with query execution (e.g., reported by computing resources) and determine an estimated number or configuration of computing resources for executing a query within some set of parameters (e.g., cost, time, etc.). For example, machine learning techniques may be applied by resource planner 330 to generate a query estimation model that can be applied to the features of a received query to determine the number/configuration of resources, in one embodiment. Resource planner 330 may then provide or identify which ones of the resources available to execute the query from a pool that may best fit the estimated number/configuration, in one embodiment.

In various embodiments, managed query service 270 may implement query tracker 340 in order to manage the execution of queries at compute clusters, track the status of queries, and obtain the resources for the execution of queries from resource management service 290. For example, query tracker 340 may maintain a database or other set of tracking information based on updates received from different managed query service agents implemented on provisioned computing resources (e.g., computing clusters as discussed below with regard to FIGS. 5-6).

Figure 4:
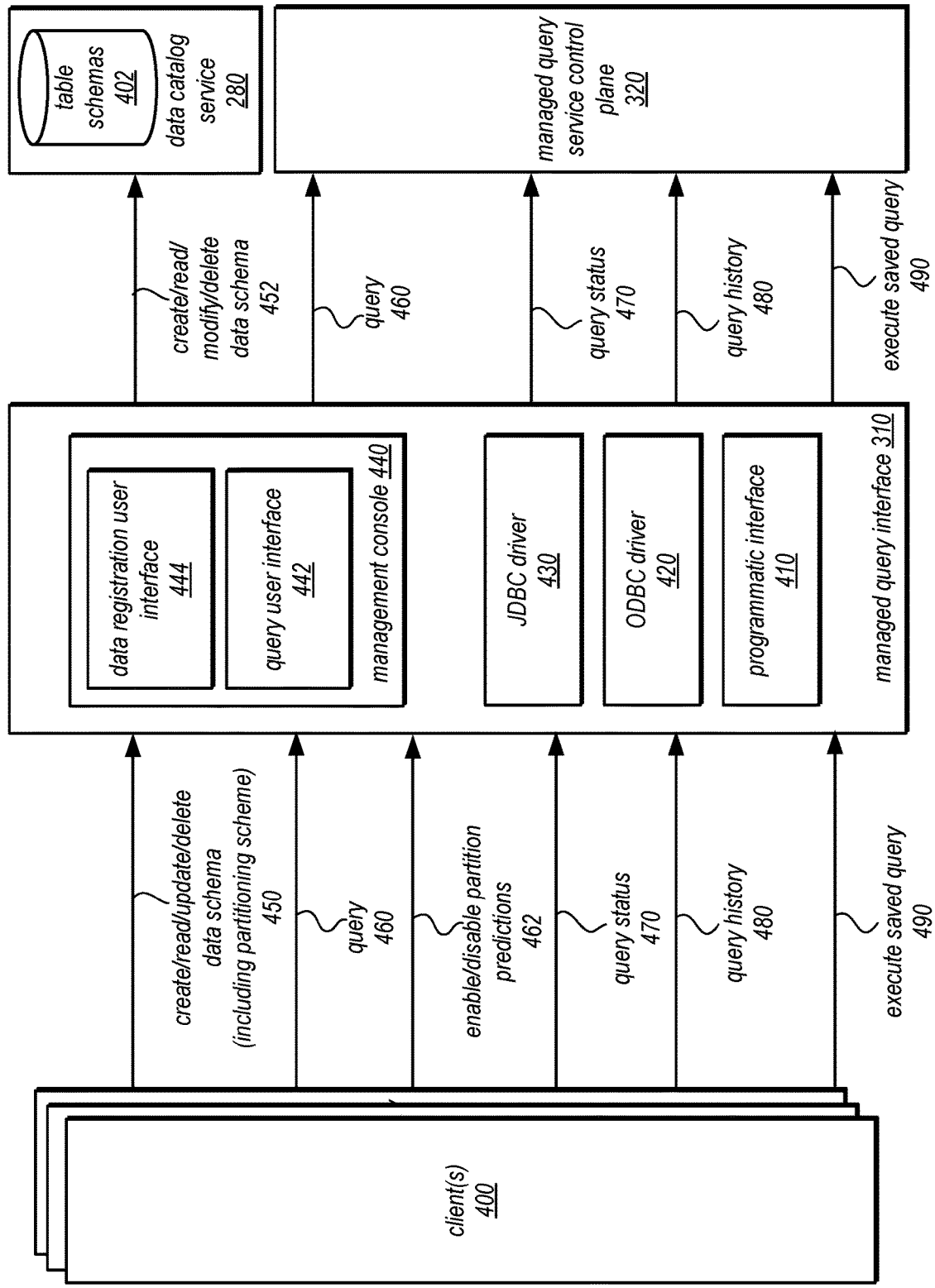
FIG. 4 is a diagram illustrating interactions between clients and managed query service, according to some embodiments.

FIG. 4 is a diagram illustrating interactions between clients and managed query service, according to some embodiments. Client(s) 400 may be client(s) 250 in FIG. 2 above or other clients (e.g., other services systems or components implemented as part of provider network regions 200 or as part of an external service, system, or component, such as data exploration or visualization tools (e.g., Tableau, Looker, MicroStrategy, Qliktech, or Spotfire). Clients 400 can send various requests to managed query service 270 via managed query interface 310. Managed query interface 310 may offer a management console 440, which may provide a user interface to submit queries 442 (e.g., graphical or command line user interfaces) or register data schemas 444 for executing queries. As part of creating/reading/updating/deleting a data schema, client(s) 400 may submit or update partitioning schemes for predicting partitions of a database table (as discussed above with regard to FIG. 1 and below with regard to FIGS. 7-9). For example, management console 440 may be implemented as part of a network-based site (e.g., an Internet website for provider network 200) that provides various graphical user interface elements (e.g., text editing windows, drop-down menus, buttons, wizards or workflows) to submit queries or register data schemas/ partitioning schemes. Managed query interface 310 may implement programmatic interfaces 410 (e.g., various Application Programming Interface (API) commands) to perform queries, and various other illustrated requests. In some embodiments, managed query interface 310 may implement custom drivers that support standard communication protocols for querying data, such as JDBC driver 430 or ODBC driver 420.

Clients 400 can submit many different types of request to managed query interface 310. For example, in one embodiment, clients 400 can submit requests 450 to create, read, modify, or delete data schemas. For example, a new table schema can be submitted via a request 450. Request 450 may include a name of the data set (e.g., table), a location of the data set (e.g. an object identifier in an object storage service, such as data storage service 230, file path, uniform resource locator, or other location indicator), number of columns, column names, data types for fields or columns (e.g., string, integer, Boolean, timestamp, array, map, custom data types, or compound data types), data format (e.g., formats including, but not limited to, JSON, CSV, AVRO, ORC, PARQUET, tab delimited, comma separated, as well as custom or standard serializers/deserializers), partition or partitioning scheme of a data set (e.g., according to time, geographic location, or other dimensions, as discussed in more detail below), or any other schema information for process queries with respect to data sets, in various embodiments. In at least some embodiments, request to create/read/ modify/delete data set schemas may be performed using a data definition language (DDL), such as Hive Query Language (HQL). Managed query interface 310 may perform respective API calls or other requests 452 with respect to data catalog service 280, to store the schema for the data set (e.g., as part of table schemas 402). Table schemas 402 may be stored in different formats (e.g., Apache Hive). Note, in other embodiments, managed query service 270 may implement its own metadata store.

Clients 400 may also send queries 460 and query status 470 requests to managed query interface 310 which may direct those requests 460 and 470 to managed query service control plane 320, in various embodiments, as discussed below with regard to FIG. 5. Queries 460 may be formatted according to various types of query languages, such as Structured Query Language (SQL) or HQL. In some embodiments client(s) 400 may submit queries which may configure the performance of query resources, such as query engines. For example, as illustrated at 462, a customer may enable or disable partitioning predictions for a database table, database, and/or user account, in some embodiments, as discussed in detail below with regard to FIG. 7. Managed query service control plane 320 may then provide instructions to enable or disable partitioning prediction as requested by instructing the provisioned cluster.

Client(s) 400 may also submit requests for query history 480 or other account related query information (e.g., favorite or common queries) which managed query. In some embodiments, client(s) 400 may programmatically trigger the performance of past queries by sending a request to execute a saved query 490, which managed query service control plane 320 may look-up and execute. For example, execute saved query request may include a pointer or other identifier to a query stored or saved for a particular user account or client. Managed query service control plane 320 may then access that user query store to retrieve and execute the query (according to techniques discussed below with regard to FIG. 5).

Figure 5:
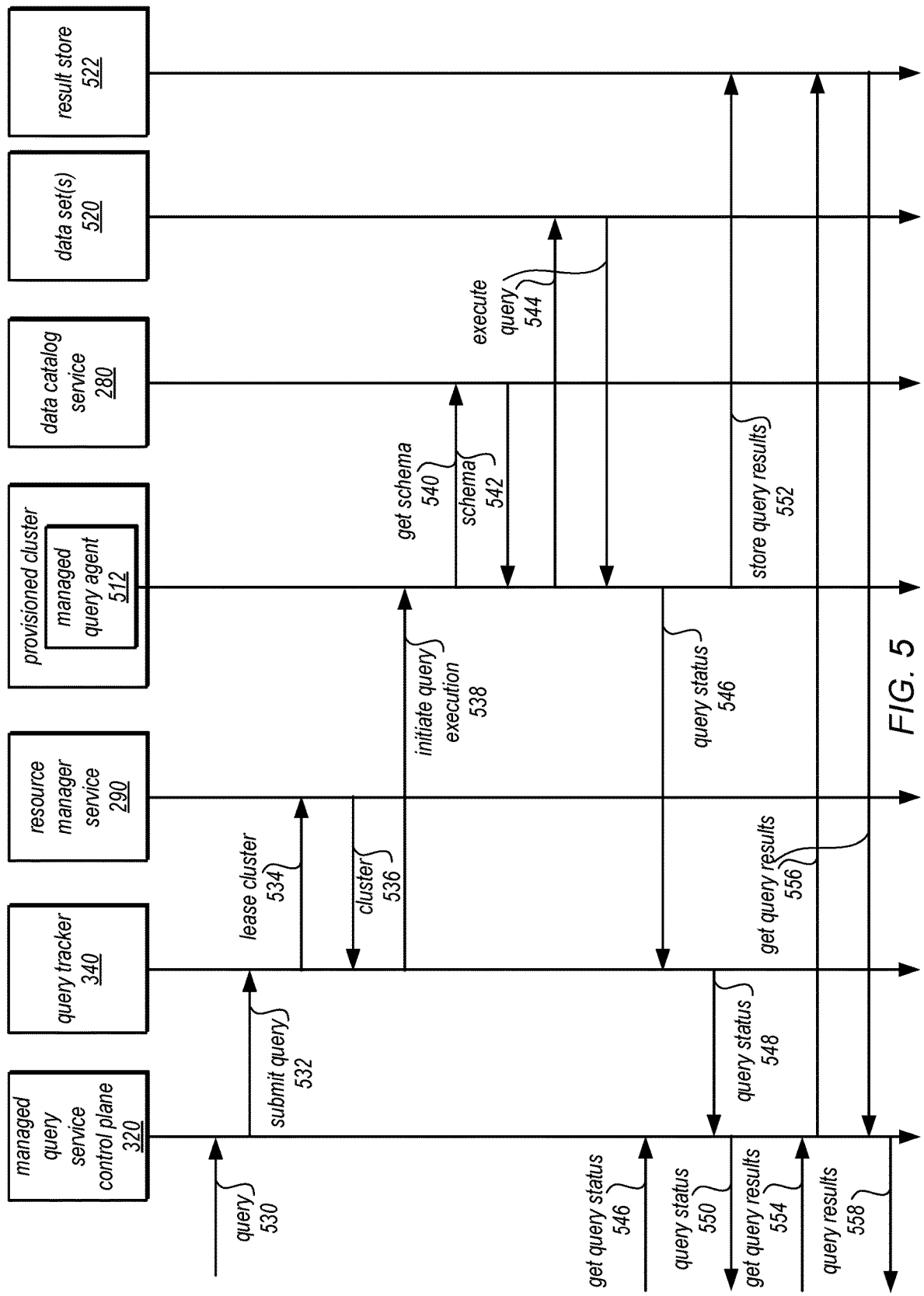
FIG. 5 is a sequence diagram for managed execution of queries, according to some embodiments.

FIG. 5 is a sequence diagram for managed execution of queries, according to some embodiments. Query 530 may be received at managed query service control plane 320 which may submit the query 532 to query tracker 340 indicating the selected cluster 536 for execution. Query tracker 340 may lease a cluster 534 from resource management service 290, which may return a cluster 536. Resource management service 290 and query tracker 340 may maintain lease state information for resources that are leased by query tracker and assigned to execute received queries. Query tracker 340 may then initiate execution of the query 538 at the provisioned cluster 510, sending a query execution instruction to a managed query agent 512.

Managed query agent 512 may get schema 540 for the data sets(s) 520 from data catalog service 280, which may return the appropriate schema 542 (including a partitioning scheme which may be used to predict partitions for performing the query as discussed below with regard to FIGS. 7-10). Provisioned cluster 510 can then generate a query execution plan and execute the query 544 with respect to data set(s) 520 according to the query plan. Managed query agent 512 may send query status 546 to query tracker 340 which may report query status 548 in response to get query status 546 request, sending a response 550 indicating the query status 550. Provisioned cluster 510 may store the query results 552 in a result store 522 (which may be a data storage service 230). Managed query service control plane 320 may receive q request to get a query results 554 and get query results 556 from results store 522 and provide the query results 558 in response, in some embodiments.

Figure 6:
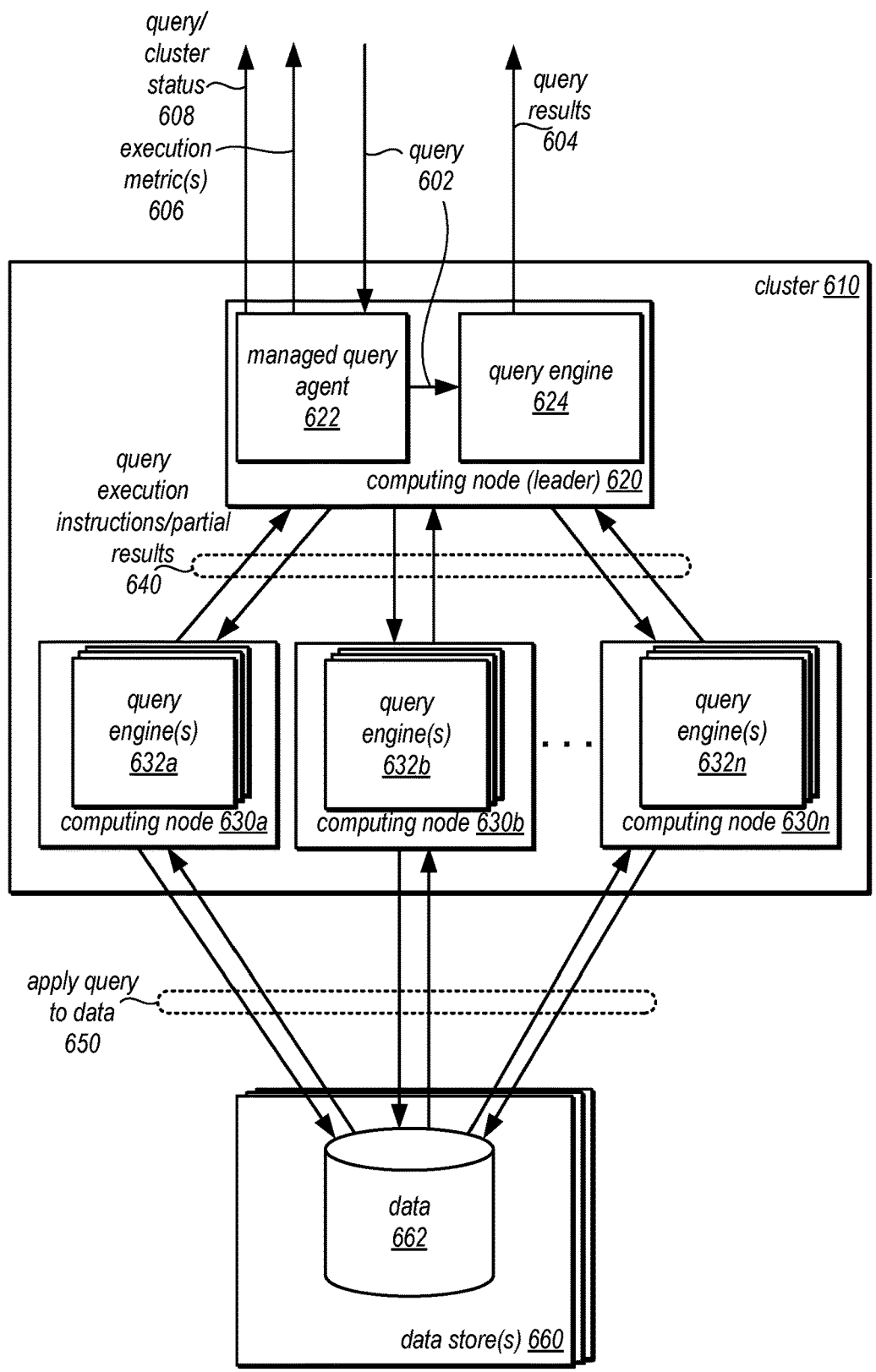
FIG. 6 is a logical block diagram illustrating a cluster processing a query as part of managed query execution, according to some embodiments.

Different types of computing resources may be provisioned and configured in resource pools, in some embodiments. Single-node clusters or multi-node compute clusters may be one example of a type of computing resource provisioned and configured in resource pools by resource management service 290 to service queries for managed query service 270. FIG. 6 is a logical block diagram illustrating a cluster processing a query as part of managed query execution, according to some embodiments. Cluster 610 may implement a computing node 620 that is a leader node (according to the query engine 624 implemented by cluster 610). In some embodiments, no single node may be a leader node, or the leader node may rotate from processing one query to the next. Managed query agent 622 may be implemented as part of leader node 620 in order to provide an interface between the provisioned resource, cluster 610, and other components of managed query service 270 and resource management service 290. For example, managed query agent 622 may provide further data to managed query service 270, such as the status 608 of the query (e.g. executing, performing I/O, performing aggregation, etc.) and execution metrics 606 (e.g., health metrics, resource utilization metrics, cost metrics, length of time, etc.). In some embodiments, managed query agent 622 may provide cluster/query status 608 and execution metric(s) 606 to resource management service 290 (in order to make pool management decisions, such as modification events, lease requests, etc.). For example, managed query agent 622 may indicate cluster status 608 to resource management service 290 indicating that a query has completed and that the cluster 610 is ready for reassignment (or other resource lifecycle operations).

Leader node 620 may implement query engine 624 to execute queries 602. For instance, managed query agent 622 may implement a programmatic interface for query tracker to submit query 602 and then send the query 602 to query engine 624. Query engine 624 may generate and execute a query plan for query 602, in some embodiments. For example, leader node 622 may send query execution instructions 640 to computing nodes that access and apply the query to data 662 in data store(s) 660 according to the plan. Compute nodes, such as nodes 630a, 630b, and 630n, may respectively implement query engines 632a, 632b, and 632n to execute the query instructions, apply the query to the data 650, and return partial results 640 to leader node 620, which in turn may generate and send query results 604. Query engine 624 and query engines 632 may implement various kinds of distributed query or data processing frameworks, such as the open source Presto distributed query framework or the Apache Spark framework.

Figure 7:
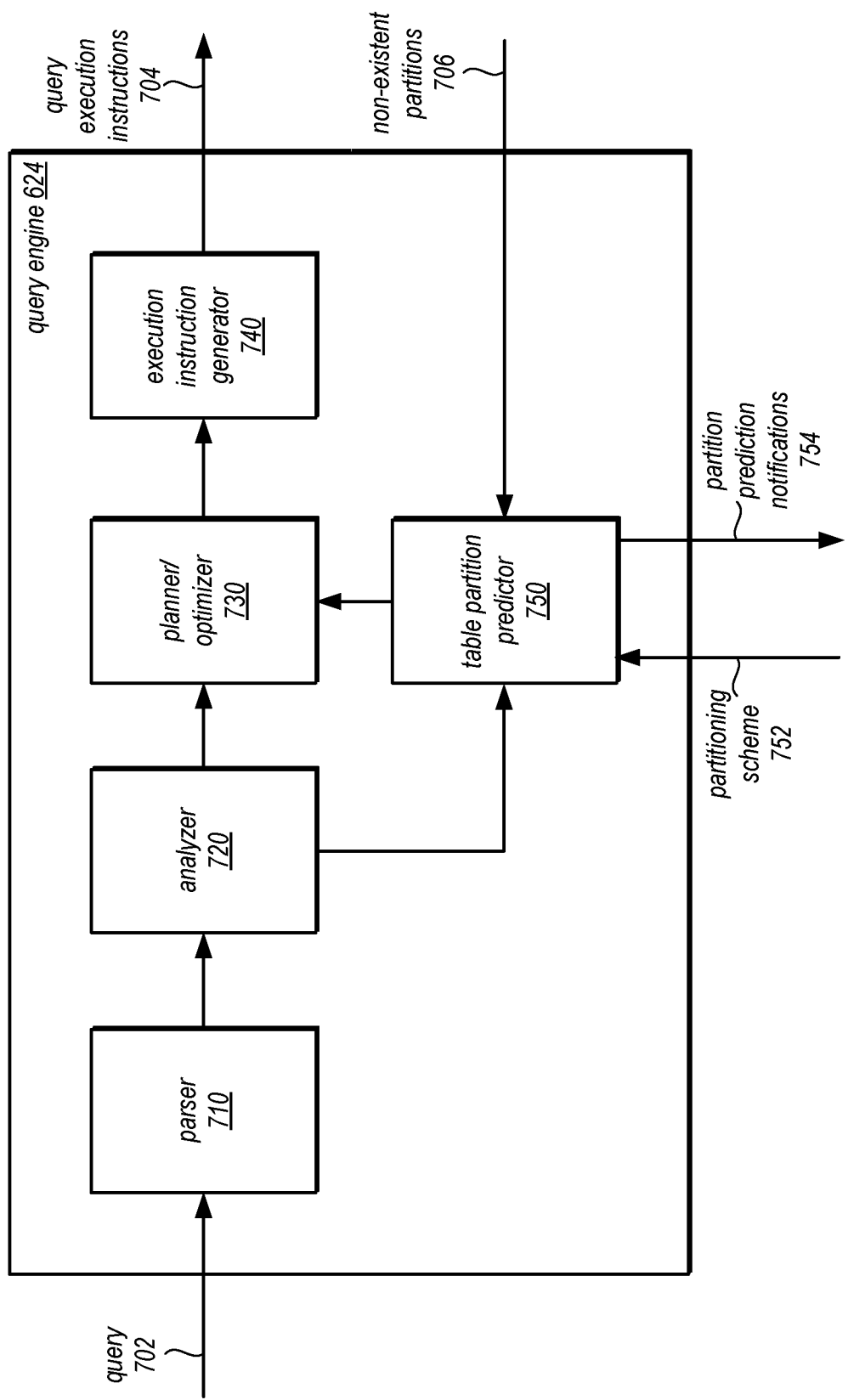
FIG. 7 is a logical block diagram illustrating a query engine that implements predicting partitions of a database table for processing database queries, according to some embodiments.

A processing cluster, such as cluster 610 may implement predicting partitions of a database table included in a query to managed query service 270. FIG. 7 is a logical block diagram illustrating a query engine that implements predicting partitions of a database table for processing database queries, according to some embodiments. Query engine 624 may implement such features or other query engines that perform queries in other systems may implement similar features. Query engine 624 may implement parser 710. Parser 710 may take a received query 702 to generate parse trees or other parsed formats of the query and provide the parsed result to analyzer 720. Analyzer 720 may perform validations (e.g., check for syntax or other query rules, such as invalid table names), and other preparation operations for initial plan generation, in some embodiments. Analyzer 720 may provide the initial plan to planner/optimizer 730 and table partition predictor 750. Planner optimizer 730 may perform operation identification and rearrangements of the plan according to specific rules that optimize query performance (e.g., based on cost estimates of different query plans).

Figure 8:
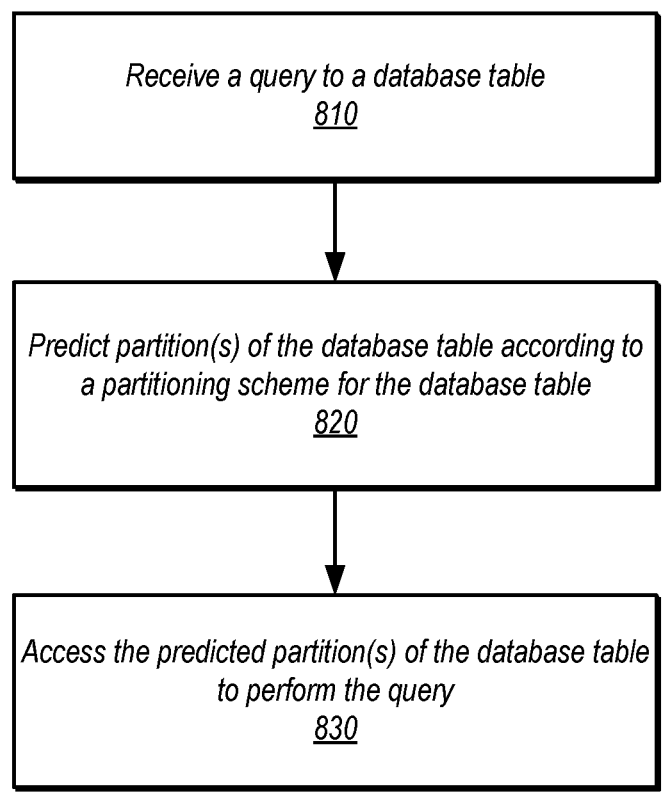
FIG. 8 is a high-level flowchart illustrating various methods and techniques to implement predicting partitions of a database table for processing database queries, according to some embodiments.
Figure 9:
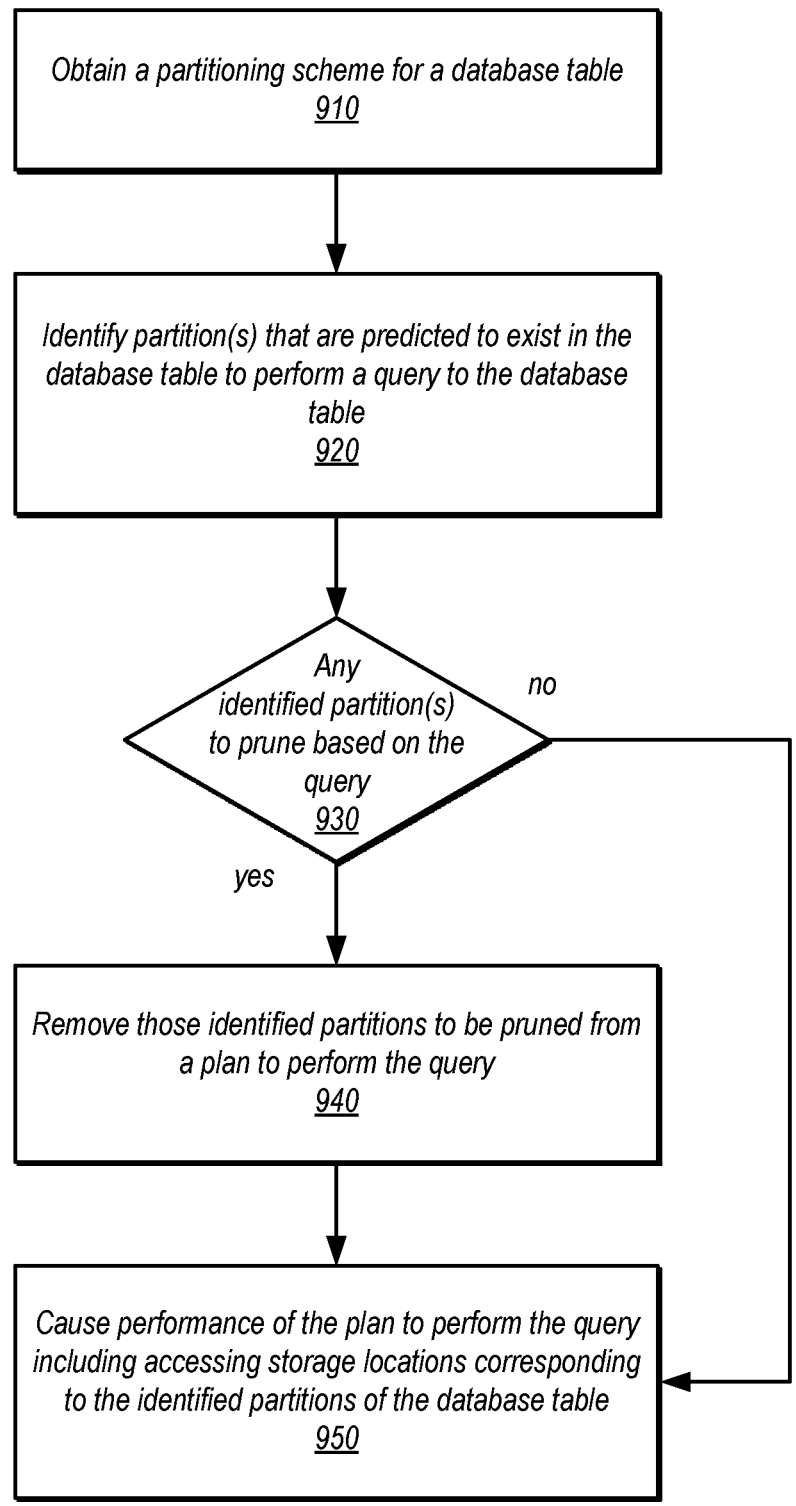
FIG. 9 is a high-level flowchart illustrating various methods and techniques to implement pruning predicted partitions when performing a database query, according to some embodiments.

In various embodiments, table partition predictor 750 may perform the various techniques discussed in detail below, with regard to FIGS. 8-10, to predict partitions for a table according to a partitioning scheme 752 received for the table. For example, given a table name, table partition predictor 750 can identify all existing partitions for that table based on the partitioning scheme (e.g., for monthly partitions from a creation time for the table up to a current time). In some embodiments, table partition predictor 750 may perform operations to analyze a database table to determine the partitioning scheme (e.g., by scanning individual files or objects likely to contain a partition to determine range values or other boundary values for recognizing the partition and to determine a pattern for mapping the range values to expected partitions). Table partition prediction 750 may also receive notifications 706 of non-existent partitions that were predicted in order to provide partition prediction notifications 754, as discussed in more detail below with regard to FIG. 10 and/or automatically disable table partition prediction for a database table. Not illustrated are requests or instructions to enable/disable partition prediction for a database table, which may be received in some embodiments, at table partition predictor 750 (as discussed above with regard to FIG. 4). Table partition predictor 750 may provide predicted table partitions to planner optimizer 730 which may develop a plan to perform the query (e.g., including performing pruning as discussed below with regard to FIG. 9). The plan may be provided to execution instruction generator 740, which may provide query execution instructions 704 to perform operations including operations that access predicted partitions, in some embodiments. Note that query engine 624 as illustrated in FIG. 7 could be implemented in other database systems (e.g., other data warehouse systems, distributed data processing systems, or database systems—distributed or not-distributed), in various embodiments.

Although FIGS. 2-7 have been described and illustrated in the context of a managed query service, or other data processing platform, such as another database service, offered by a provider network that can perform partitioning predictions of database tables to process database queries, the various components illustrated and described in FIGS. 2-7 may be easily applied to other systems, or devices that host and/or provide access to database queries. As such, FIGS. 2-7 are not intended to be limiting as to other embodiments of a system that may implement predicting partitions of a database table for processing database queries. FIG. 8 is a high-level flowchart illustrating various methods and techniques to implement predicting partitions of a database table for processing database queries, according to some embodiments. Various different systems and devices may implement the various methods and techniques described below, either singly or working together. For example, a managed query service, database service, or data processing service as described above with regard to FIGS. 2-7 may implement the various methods. Alternatively, a combination of different systems and devices may implement these methods. Therefore, the above examples and or any other systems or devices referenced as performing the illustrated method, are not intended to be limiting as to other different components, modules, systems, or configurations of systems and devices.

As indicated at 810, a query to a database table may be received, in various embodiments. The query may be received via various interfaces, protocols, or connections. For example, a query may be received via the various types of interfaces described above with regard to FIG. 4 (programmatic, user console, driver, etc.), in one embodiment. A query may be formatted according to different query languages, or specifications of query languages including Structured Query Language (SQL) and/Hive Query Language (HQL). The query may include execution hints, specifying the type of query execution engine to utilize, query execution limits, or other parameters or properties for configuring the execution of the query, in some embodiments. In some embodiments, the query may be specified as a programmatic interface request (e.g., an API) which may retrieve, search, scan or otherwise specify what data is to be retrieved from a database table (e.g., without explicitly stating that the request is a query). Various other application interfaces, such as Java Database Connectivity (JDBC) or Open Database Connectivity (ODBC), may be used to establish connections to submit the query in addition to or instead of the programmatic interfaces discussed above, in some embodiments.

In various embodiments, the query may identify a database table upon which the query is to be performed. For example, the query may include a table name or other identifier that indicates a table in a SQL select statement or in a parameter for a API request. The database table may be invoked as part of an operation to manipulate the results taken from the database table (e.g., a filter to return results that satisfies a predicate), in some embodiments. In some embodiments, features of the query may indicate what partitions of a database table would satisfy the query (e.g., query predicates may indicate which partitions should be evaluated).

As indicated at 820, partition(s) of the database table may be predicted according to a partitioning scheme for the database table, in various embodiments. A partitioning scheme may map, associate, or otherwise identify ranges or portions of the database table (e.g., different data type values, columns values, etc.) which may be logically or physically grouped together according to a function, formula, series, or other pattern which may map the ranges or portions of the database table according to the pattern, in some embodiments. For example, the partitioning scheme may map ranges of one or more column values (e.g., a time value, transaction number, or other value with customer, geographic location, business unit, etc.). The predicted partitions may be determined as part of generating a query plan or other instructions for performing the query (e.g., by evaluating a parse tree of the query, applying query rewrite rules, optimizing the query plan for performance, etc.), in some embodiments.

The function, formula, series, or pattern may be predictive of what the ranges/portions are, the boundary values of the ranges/portions, and/or may be if, for instance, additional data were to be added to the database table, in some embodiments. For example, a time-based pattern may map range values within distinct calendar months and years as different partitions to portions of the database table that have a month/year value within the respective range values (e.g., January 2018 records are in partition A, February 2018 records are in partition B, and so on). Prediction of database table partitions may, in some embodiments, be based on other information in addition to information from the query. Consider the month-year example given above. If a query where to specify a relative predicate value, such as last 12 months of data from the database table, then the current month may be used to predict which partitions may be in the database table by starting with a partition for the current month and going backward to 11 prior months. Please note that other patterns, series, or sequences of database table values that can be mapped to distinct partitions may be used and thus the previous example is not intended to be limiting. As discussed below with regard to FIG. 9, the partitioning scheme may be obtained from a user (or other system) or may be determined for the database table (e.g., prior to the query being received) by analyzing the database table.

In at least some embodiments, the predicated partition(s) of the database table may be accessed to perform the query, as indicated at 830. For example, storage locations for partitions (e.g., storage devices, storage nodes, assigned worker, processing, compute or other query performance resources responsible for the predicted partitions may be instructed to apply or otherwise perform the query (e.g., search for values in the partition that satisfy the predicate, join the values from the partition with other database tables, manipulate found values, etc.). In at least some embodiments, none, some, or all predicted partitions may not exist in the database table. Non-existent partitions identified according to the partitioning scheme may be tracked, as discussed below with regard to FIG. 10, in order to implement various notification, optimization, and/or automated features. For instance, in some embodiments, non-existent partitions may be added to a list or other metadata that may be used to prune, ignore, skip, or otherwise remove partitions from evaluation in a query plan, similar to partitioning pruning discussed below with regard to FIG. 9. Non-existent partitions may be used as feedback or learning material which may be used to update or reformulate the partitioning scheme to more accurately predict partitions (e.g., by adjusting the granularity of partitions from calendar months to financial quarters).

Predicting partitions may improve the performance of performing database queries, in many embodiments. For example, partition pruning techniques may take advantage of the discoverable or dynamically generated metadata that may be obtained by evaluating a partitioning scheme—instead of accessing, reading, and/or evaluating statically stored/maintained/updated partition metadata which can grow large and impede query plan generation and/or performance—in order to quickly identify which partitions can be pruned out of a plan for performing a database query. FIG. 9 is a high-level flowchart illustrating various methods and techniques to implement pruning predicted partitions when performing a database query, according to some embodiments.

As indicated 910, a partitioning scheme may be obtained for a database table, in various embodiments. Partitioning schemes may be obtained in several ways. For example, in some embodiments, an interface may allow users (or other systems) to submit the partitioning scheme. A partitioning scheme may be represented as a formula, series, function, or other indication of a pattern (e.g., by indicating how the boundary values or ranges of one or more columns in the database table map to partitions) that is included in an API request or other communication received via the interface (e.g., a parameter that specifies period (e.g., a month), a parameter that specifies frequency (e.g., each month, every other month, etc.), parameter(s) that specify column(s)). In some embodiments, the column(s) selected for partitioning may determine or indicate the pattern (e.g., partitioning by user identifier, geographic identifier, etc.).

In some embodiments, partitioning schemes may be obtained by analyzing the database table. For example, the database table may be stored in different locations which may correspond to different partitions (e.g., separate files, such as log files). The database table (e.g., the files) may be scanned or evaluated to identify partition boundaries, frequency, or other information that can be represented as a partitioning scheme to predict future partitions that may be added to the database table (e.g., by examining the log files, a partitioning scheme can be determined to be a single partition corresponding to a single day, with a new partition to be generated, added, or expected every day), in some embodiments. In some embodiments, pattern recognition techniques, time series analysis, or other techniques for evaluating groupings or collections of data (e.g., using machine learning techniques, such as various kinds of clustering or classification techniques) may be performed upon data (and/or data related events, such as uploads, updates, additions, deletions, queries, etc.) in order to automatically identify the partitioning scheme for a database table.

In some embodiments, analysis of the database table may be triggered upon detection of a table partitioning scheme or update event (e.g., a data upload of the table or additions to the table). In some embodiments, analysis of the database table may be triggered to identify updates or changes to the partitioning scheme for the database table. For example, an update event may be triggered when an amount of data is added to the database table above some threshold so that an analysis may be performed to determine whether updates to the partitioning scheme should be made inclusive of the additional amount of data). Other update events for a partitioning scheme may include time thresholds or numbers of non-existent partitions that were predicted to exist, in some embodiments.

As indicated at 920, partition(s) that are predicted to exist in the database table to perform a query to the database table may be identified, in some embodiments. For example, in some embodiments, partitions to be evaluated to perform the query may be identified by identifying whether the partition boundaries of a partition can satisfy the query (e.g., can the boundaries of time values in a partition satisfy a time value predicate in the query, such as does a partition contain time values less than X and greater than Y). The prediction of partitions may be based on generating a list of likely partitions according to the partitioning scheme (e.g., using the period and frequency to determine a number and respective partition boundaries that should exist according to the partitioning scheme).

As indicated at 930, some partition(s) may be identified to prune based on the query, in some embodiments. As noted above, pruning predicted partitions may remove predicted partitions that cannot satisfy the query (whether or not the predicted partitions actually exist). If as indicated by the positive exit from 930, partition(s) need to be pruned, then as indicated at 940, those identified partitions to be pruned may be removed from a plan to perform the query, in various embodiments. For example, operations that specify query operations in the plan (e.g., scan, filter, aggregate, etc.) may be removed for the pruned partition(s) so that no attempts to operate on the pruned partitions may be performed.

As indicated at 950, performance of the plan to perform the query may be caused including accessing storage locations corresponding to the identified partitions of the database table, in various embodiments. For example, the plan operations for identified partitions may include the storage locations (or instructions to obtain the storage locations from an index or other mapping information). Note that for those partitions not pruned, an attempt to access the partition may be made (even if the partition does not exist), in some embodiments. For those partitions that do not exist, an error indication or other event may occur that triggers the removal of that partitions operations from the plan to perform the query, in some embodiments (though the query may still be performed with respect to identified partitions that exist).

In the scenario discussed above and other situations, predicted partitions of the database table according to the partitioning scheme may not actually exist in storage for the database table. FIG. 10 is a high-level flowchart illustrating various methods and techniques to tracking predicted partitions that do not exist, according to some embodiments. As indicated at 1010, predicted partitions that do not exist may be tracked in some embodiments. For example, metadata for the database table may be maintained to increment a missing partition count each time a query is performed an attempt to access a predicated partition is unsuccessful. In some embodiments, a "black list" of missing partitions may be maintained so that query partitions that do not exist are not attempted when performing (or planning) the query.

Tracking predicted partitions that do not exist may allow for further optimizations. For example, in some embodiments, a number of predicted partitions that does not exist may be compared with a prediction disablement threshold, as indicated at 1020. If the number exceeds the threshold, then as indicated at 1030, a notification to disable the partitioning prediction for the database table may be sent, in some embodiments. For example, the notification may be provided via an interface to a user (e.g., a graphical user interface console or communication/message) which identifies a database table for which it is recommended to disable partitioning prediction, in some embodiments. In some embodiments, not illustrated, the partitioning prediction may be automatically disabled for the table (although it could remain enabled for other tables in a same database, data warehouse, user account, or other larger group of data that could include multiple database tables).

The methods described herein may in various embodiments be implemented by any combination of hardware and software. For example, in one embodiment, the methods may be implemented by a computer system (e.g., a computer system as in FIG. 11) that includes one or more processors executing program instructions stored on a computer-readable storage medium coupled to the processors. The program instructions may be configured to implement the functionality described herein (e.g., the functionality of various servers and other components that implement the network-based virtual computing resource provider described herein). The various methods as illustrated in the figures and described herein represent example embodiments of methods. The order of any method may be changed, and various elements may be added, reordered, combined, omitted, modified, etc.

Figure 11:
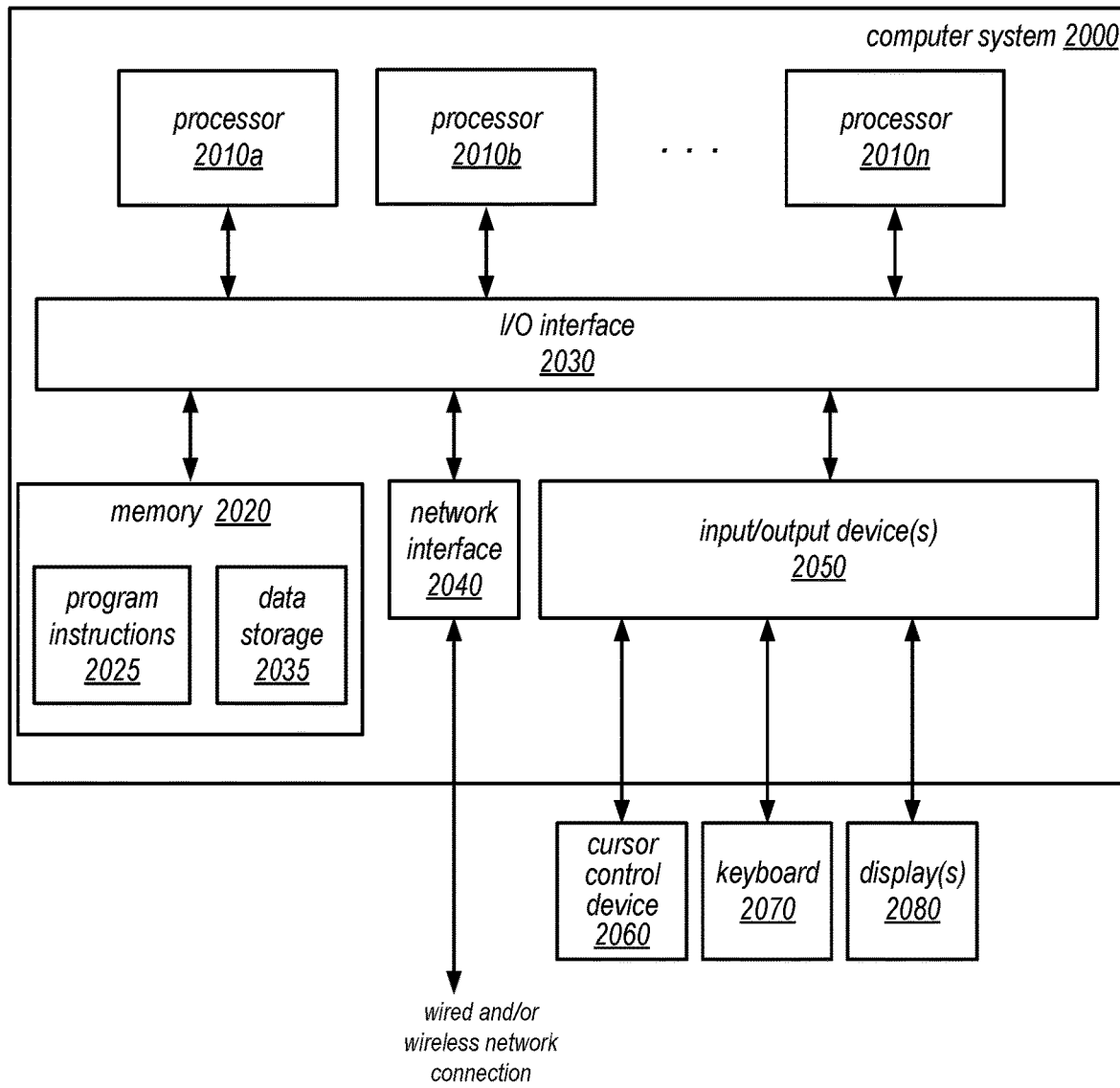
FIG. 11 illustrates an example system configured to implement the various methods, techniques, and systems described herein, according to some embodiments.

Embodiments of predicting partitions of a database table for processing a database query as described herein may be executed on one or more computer systems, which may interact with various other devices. One such computer system is illustrated by FIG. 11. In different embodiments, computer system 2000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing device, computing node, compute node, computing system, compute system, or electronic device.

In the illustrated embodiment, computer system 2000 includes one or more processors 2010 coupled to a system memory 2020 via an input/output (I/O) interface 2030. Computer system 2000 further includes a network interface 2040 coupled to I/O interface 2030, and one or more input/output devices 2050, such as cursor control device 2060, keyboard 2070, and display(s) 2080. Display(s) 2080 may include standard computer monitor(s) and/or other display systems, technologies or devices. In at least some implementations, the input/output devices 2050 may also include a touch- or multi-touch enabled device such as a pad or tablet via which a user enters input via a stylus-type device and/or one or more digits. In some embodiments, it is contemplated that embodiments may be implemented using a single instance of computer system 2000, while in other embodiments multiple such systems, or multiple nodes making up computer system 2000, may host different portions or instances of embodiments. For example, in one embodiment some elements may be implemented via one or more nodes of computer system 2000 that are distinct from those nodes implementing other elements.

In various embodiments, computer system 2000 may be a uniprocessor system including one processor 2010, or a multiprocessor system including several processors 2010 (e.g., two, four, eight, or another suitable number). Processors 2010 may be any suitable processor capable of executing instructions. For example, in various embodiments, processors 2010 may be general-purpose or embedded processors implementing any of a variety of instruction set architectures (ISAs), such as the x86, PowerPC, SPARC, or MIPS ISAs, or any other suitable ISA. In multiprocessor systems, each of processors 2010 may commonly, but not necessarily, implement the same ISA.

In some embodiments, at least one processor 2010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 2020 may store program instructions and/or data accessible by processor 2010. In various embodiments, system memory 2020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above are shown stored within system memory 2020 as program instructions 2025 and data storage 2035, respectively. In other embodiments, program instructions and/or data may be received, sent or stored upon different types of computer-accessible media or on similar media separate from system memory 2020 or computer system 2000. Generally speaking, a non-transitory, computer-readable storage medium may include storage media or memory media such as magnetic or optical media, e.g., disk or CD/DVD-ROM coupled to computer system 2000 via I/O interface 2030. Program instructions and data stored via a computer-readable medium may be transmitted by transmission media or signals such as electrical, electromagnetic, or digital signals, which may be conveyed via a communication medium such as a network and/or a wireless link, such as may be implemented via network interface 2040.

In one embodiment, I/O interface 2030 may coordinate I/O traffic between processor 2010, system memory 2020, and any peripheral devices in the device, including network interface 2040 or other peripheral interfaces, such as input/output devices 2050. In some embodiments, I/O interface 2030 may perform any necessary protocol, timing or other data transformations to convert data signals from one component (e.g., system memory 2020) into a format suitable for use by another component (e.g., processor 2010). In some embodiments, I/O interface 2030 may include support for devices attached through various types of peripheral buses, such as a variant of the Peripheral Component Interconnect (PCI) bus standard or the Universal Serial Bus (USB) standard, for example. In some embodiments, the function of I/O interface 2030 may be split into two or more separate components, such as a north bridge and a south bridge, for example. In addition, in some embodiments some or all of the functionality of I/O interface 2030, such as an interface to system memory 2020, may be incorporated directly into processor 2010.

Network interface 2040 may allow data to be exchanged between computer system 2000 and other devices attached to a network, such as other computer systems, or between nodes of computer system 2000. In various embodiments, network interface 2040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 2050 may, in some embodiments, include one or more display terminals, keyboards, keypads, touchpads, scanning devices, voice or optical recognition devices, or any other devices suitable for entering or retrieving data by one or more computer system 2000. Multiple input/output devices 2050 may be present in computer system 2000 or may be distributed on various nodes of computer system 2000. In some embodiments, similar input/output devices may be separate from computer system 2000 and may interact with one or more nodes of computer system 2000 through a wired or wireless connection, such as over network interface 2040.

As shown in FIG. 11, memory 2020 may include program instructions 2025, may implement the various methods and techniques as described herein, and data storage 2035, comprising various data accessible by program instructions 2025. In one embodiment, program instructions 2025 may include software elements of embodiments as described herein and as illustrated in the Figures. Data storage 2035 may include data that may be used in embodiments. In other embodiments, other or different software elements and data may be included.

Those skilled in the art will appreciate that computer system 2000 is merely illustrative and is not intended to limit the scope of the techniques as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 2000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a non-transitory, computer-accessible medium separate from computer system 2000 may be transmitted to computer system 2000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

It is noted that any of the distributed system embodiments described herein, or any of their components, may be implemented as one or more web services. For example, leader nodes within a data warehouse system may present data storage services and/or database services to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the web service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a web services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

The various methods as illustrated in the FIGS. and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
    a memory to store program instructions which, if performed by at least one processor, cause the at least one processor to perform a method to at least:
        receive a query to a database table;
        obtain a partitioning scheme for the database table;
        predict existence of one or more partitions of the database table according to the partitioning scheme for the database table; and
        access the predicted partitions of the database table to perform the query.

2. The system of claim 1, wherein to obtain the partitioning scheme for the database table the program instructions cause the at least one processor to perform the method to at least receive the partitioning scheme for the database table via an interface from a user.

3. The system of claim 1, wherein the program instructions cause the at least one processor to further perform the method to at least:
    track predicted partitions that do not exist for one or more queries to the database table including the query; and
    after a determination that a number of predicted partitions that do not exist exceed a prediction disablement threshold, send a notification to disable partitioning prediction for the database table.

4. The system of claim 1, wherein the query is received at a managed query service that is offered by a provider network and wherein the database table is stored as part of a storage service offered by the provider network.

5. A method, comprising:
    responsive to a query to a database table,
        accessing one or more partitions of the database table predicted to exist according to the partitioning scheme for the database table to perform the query to the database table.

6. The method of claim 5, further comprising receiving the partitioning scheme for the database table via an interface from the user.

7. The method of claim 5, further comprising analyzing the database table to determine the partitioning scheme.

8. The method of claim 5, further comprising responsive to detecting an update event for the partitioning scheme, performing an update to the partitioning scheme according to the update event.

9. The method of claim 5, wherein accessing the one or more partitions of the database table predicted to exist according to the partitioning scheme for the database table to perform the query to the database table further comprise identifying at least one of the one or more predicted partitions to prune from a plan to perform the query.

10. The method of claim 5, further comprising:
    tracking predicted partitions that do not exist for one or more queries to the database table including the query; and
    responsive to receiving another query, ignoring at least one of one or more predicted partitions of the database table according to the tracking when accessing the one or more predicted partitions of the database table to perform the other query.

11. The method of claim 5, wherein the partitioning scheme associates one or more columns with respective projected ranges.

12. The method of claim 5, further comprising:
tracking predicted partitions that do not exist for one or more queries to the database table including the query; and
after a determination that a number of predicted partitions that do not exist exceed a prediction disablement threshold, sending a notification to disable partitioning prediction for the database table.

13. The method of claim 5, further comprising:
receiving a request to disable partitioning prediction via an interface from a user; and
responsive to the request to disable, disabling partitioning prediction for subsequent queries.

14. A non-transitory, computer-readable storage medium, storing program instructions that when executed by one or more computing devices cause the one or more computing devices to implement:
receiving a query to a database table;
responsive to receiving the query:
predicting existence of one or more partitions of the database table according to a partitioning scheme for the database table; and
accessing the predicted partitions of the database table to perform the query.

15. The non-transitory, computer-readable storage medium of claim 14 wherein the program instructions further cause the one or more computing devices to implement analyzing the database table to determine the partitioning scheme.

16. The non-transitory, computer-readable storage medium of claim 14 wherein the program instructions further cause the one or more computing devices to implement receiving the partitioning scheme for the database table via an interface from the user.

17. The non-transitory, computer-readable storage medium of claim 14, wherein the program instructions cause the one or more computing devices to implement:
receiving a request to update the partitioning scheme via an interface from a user; and
responsive to the request to update, performing the update to the partitioning scheme according to the request.

18. The non-transitory, computer-readable storage medium of claim 14 wherein the program instructions further cause the one or more computing devices to implement:
before receiving the query to the database table, receiving a request to enable partitioning prediction for the database table.

19. The non-transitory, computer-readable storage medium of claim 14, wherein the program instructions further cause the one or more computing devices to implement:
tracking predicted partitions that do not exist for one or more queries to the database table including the query; and
after a determination that a number of predicted partitions that do not exist exceed a prediction disablement threshold, automatically disabling partitioning prediction for subsequent queries.

20. The non-transitory, computer-readable storage medium of claim 14, wherein the query is received at a database service or data processing service that is offered by a provider network.

* * * * *